(12) United States Patent
Baker et al.

(10) Patent No.: US 11,364,740 B2
(45) Date of Patent: Jun. 21, 2022

(54) WHEEL WEIGHT ASSEMBLY AND ATTACHMENT METHOD

(71) Applicant: DEERE & COMPANY, Moline, IL (US)

(72) Inventors: Justin Baker, Dike, IA (US); Benjamin Heimbuch, Cedar Falls, IA (US); Jonathan Roth, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 313 days.

(21) Appl. No.: 16/547,936

(22) Filed: Aug. 22, 2019

(65) Prior Publication Data

US 2021/0053392 A1    Feb. 25, 2021

(51) Int. Cl.
   B60B 15/28    (2006.01)

(52) U.S. Cl.
   CPC ........ B60B 15/28 (2013.01); *B60B 2310/305* (2013.01); *B60Y 2200/221* (2013.01)

(58) Field of Classification Search
   CPC .................................................... B60B 15/28
   See application file for complete search history.

(56) References Cited

U.S. PATENT DOCUMENTS

| | | | |
|---|---|---|---|
| 2,988,401 A * | 6/1961 | Kenneth | ................. B60B 15/28 301/53.5 |
| 3,644,002 A | 2/1972 | Barth et al. | |
| 3,774,970 A | 11/1973 | Murphy et al. | |
| 6,132,007 A * | 10/2000 | Harmsen | ................. B60B 15/28 301/53.5 |
| 6,283,556 B1 * | 9/2001 | Taylor | .................... B60B 15/28 301/53.5 |
| 7,182,409 B2 * | 2/2007 | Thomas | ................. B60B 15/28 301/53.5 |
| 8,944,521 B2 | 2/2015 | Roth et al. | |
| 9,752,647 B2 | 9/2017 | Rockl et al. | |
| 10,457,092 B2 | 10/2019 | Bhosale et al. | |
| 2018/0281512 A1 | 10/2018 | Letscher et al. | |
| 2018/0345721 A1 | 12/2018 | Letscher et al. | |

* cited by examiner

*Primary Examiner* — Jason R Bellinger
(74) *Attorney, Agent, or Firm* — Taft Stettinius & Hollister LLP; Stephen F. Rost

(57) ABSTRACT

A wheel weight assembly with inner and outer weights, inner and outer fasteners, and anti-rotation plates. Inner fasteners can include inner and outer nuts, and a stud that extends through inner weight. Outer nuts can attach to studs and outer fasteners. Anti-rotation plates can fit over outer nuts in recesses of inner weight to prevent rotation of outer nuts. The weight assembly can also include intermediate weight and intermediate fasteners. Intermediate fasteners can include intermediate nuts and studs, where proximal end of stud attaches to inner fastener, and distal end of stud extends into recess of intermediate weight. Intermediate nuts can attach to distal ends of studs, and to outer fasteners. Anti-rotation plates fit over intermediate nuts in recesses of intermediate weight to prevent rotation of intermediate nuts. Anti-rotation plates and recesses can be pear-shaped. Cut-outs in anti-rotation plates and intermediate nuts can be polygonal-shaped.

20 Claims, 6 Drawing Sheets

WHEEL WEIGHT ASSEMBLY AND ATTACHMENT METHOD

FIELD OF THE DISCLOSURE

The present disclosure relates to wheel weight assemblies, and more particularly to wheel weight assemblies with multiple weights that be re-torqued from outboard access only.

BACKGROUND

Wheel weight assemblies can be used in tractors and various other types of vehicles. Adding weight to the wheels of a vehicle can increase the traction of the vehicle enabling it to better handle rough, steep or other terrains. Wheel weight assemblies can be time consuming and difficult to mount. Some wheel weight assemblies include long bolts that must be inserted through holes in the wheel from the inside so that the bolt shanks which extend outwardly from the disk of the wheel droop downwardly by gravity. It can be difficult to slip the holes in the weights over the bolts, because a heavy wheel weight must be lifted and held in place while the holes are aligned with the bolts. Other wheel weight assemblies include one or more weights that are attached to the wheel using a stud-type bolt that protrudes through the wheel and then through the weight. Successive weights can be attached to the previous weights using bolts. This can make weight removal time consuming and difficult. Having more weights can enable each weight to be lighter while still providing a similar traction increase, however It can be difficult to torque or re-torque the wheel weight assembly when multiple pieces are involved in fastening the weight assembly together.

It would be desirable to provide a wheel weight assembly that includes a plurality of wheel weights, where the fasteners hold the wheel weights together against the wheel, and the fasteners can be torqued and/or re-torqued with only outboard access to the fastener assembly.

SUMMARY

A wheel weight assembly is disclosed for mounting to a vehicle wheel that includes a disk. The wheel weight assembly includes an inner and outer weights, inner and outer fasteners, and anti-rotation plates. The inner weight has mounting bores that extend axially through the inner weight, and recesses where each mounting bore is located in an associated recess. Each inner fastener is configured to extend through one of the mounting bores of the inner weight. Each inner fastener has a proximal end configured to attach to the disk, and a distal end configured to attach in the associated recess of the inner weight. Each anti-rotation plate is configured to cooperate with the distal end of an inner fastener within the associated recess of the inner weight. The outer weight has mounting bores that extend axially through the outer weight. Each outer fastener is configured to extend through one of the mounting bores of the outer weight and attach to the distal end of one of the inner fasteners to hold the outer weight to the disk.

Each inner fastener can include an inner nut that attaches to the disk, a stud that extends through one of the mounting bores of the inner weight, and an outer nut that attaches to one of the outer fasteners. The inner nut can attach to a proximal end of the stud; the distal end of the stud can extend through the mounting bore of the inner weight and into the associated recess; and the outer nut can attach to the distal end of the stud to hold the inner weight to the disk. For each attachment between an outer nut, an anti-rotation plate and a stud in a recess of the inner weight, when the outer nut is attached to the distal end of the stud in the recess, and the anti-rotation plate is fit over the outer nut and into the recess of the inner weight then a nut shape of the outer nut, a plate shape of the anti-rotation plate and a recess shape of the recess can prevent further rotation of the outer nut in the recess of the inner weight. A proximal end of each of the outer nuts of the inner fasteners can have a generally polygonal or hexagonal shaped cross-section. Each of the anti-rotation plates can have a generally pear-shape with a broader end and a narrower end, and a cutout in the broader end, where the cutout can be shaped to fit over one of the outer nuts. Each of the recesses of the inner weight can have a generally pear-shape with a broader end and a narrower end, where the mounting bore associated with the recess is located near the broader end of the pear-shape, and the pear-shape of the recess is shaped to fit the pear-shape of one of the anti-rotation plates.

A wheel weight assembly is disclosed for mounting to a vehicle wheel that includes a disk with an outer face and an inner face. The wheel weight assembly includes a starter weight, inner fasteners, an intermediate weight, intermediate fasteners, an outer weight, outer fasteners and anti-rotation plates. The starter weight has mounting bores that extend axially through the starter weight. Each inner fastener is configured to extend through one of the mounting bores of the starter weight and attach the starter weight to the outer face of the disk. The intermediate weight has mounting bores that extend axially through the intermediate weight, and a connection recesses where each mounting bore is located in an associated connection recess. The intermediate fasteners are configured to extend through one of the mounting bores of the intermediate weight and into the associated connection recess. Each intermediate fastener has a proximal end configured to attach to one of the inner fasteners, and a distal end configured to extend into the associated connection recess of the intermediate weight to attach the intermediate weight to the starter weight. Each anti-rotation plate is configured to fit over one of the intermediate fasteners and fit within one of the connection recesses of the intermediate weight. The outer weight has mounting bores that extend axially through the outer weight. Each outer fastener is configured to extend through one of the mounting bores of the outer weight and attach to one of the intermediate fasteners to attach the outer weight to the intermediate weight.

Each inner fastener can include an inner bolt and a starter nut. Each inner bolt can have a distal end, and can extend through one of the mounting bores of the starter weight. Each starter nut can attach to the distal end of the inner bolt to attach the starter weight to the outer face of the disk. Each intermediate fastener can include an intermediate nut and an intermediate stud with a proximal end and a distal end. Each intermediate stud can extend through one of the mounting bores of the intermediate weight and into the associated connection recess. The proximal end of the intermediate stud can attach to one of the starter nuts of the inner fasteners, and the distal end of the intermediate stud can extend into the associated connection recess of the intermediate weight. Each intermediate nut can attach to the distal end of the intermediate stud to attach the intermediate weight to the starter weight. Each outer fastener can attach to one of the intermediate nuts to attach the outer weight to the intermediate weight.

The starter weight can include insets where each of the mounting bores of the starter weight is in one of the insets, and each starter nut can fit in a corresponding inset of the starter weight such that the corresponding inset prevents rotation of the starter nut. Each inner bolt can include a proximal head, and each inner bolt can extend through the disk and a corresponding mounting bore of the starter weight such that the proximal head of the inner bolt contacts the inner face of the disk and the distal end of the inner bolt extends through the corresponding mounting bore.

For each attachment between an intermediate nut, an anti-rotation plate and an intermediate stud in a connection recess of the intermediate weight, when the intermediate nut is attached to the distal end of the intermediate stud in the connection recess of the intermediate weight, and the anti-rotation plate is fit over the intermediate nut and into the connection recess then a nut shape of the intermediate nut, a plate shape of the anti-rotation plate and a recess shape of the connection recess can prevent further rotation of the intermediate nut in the connection recess of the intermediate weight. A proximal end of each of the intermediate nuts can have a generally polygonal or hexagonal shaped cross-section. Each of the plurality of anti-rotation plates can have a generally pear-shape with a broader end and a narrower end, and a cutout in the broader end, where the cutout is shaped to fit over one of the intermediate nuts. Each connection recess of the intermediate weight can have a generally pear-shape with a broader end and a narrower end, where the mounting bore associated with the connection recess is located near the broader end of the pear-shape, and the pear-shape of the connection recess is shaped to fit the pear-shape of one of the anti-rotation plates. The proximal end of each of the intermediate nuts can have a hexagonal shaped cross-section, and the cutout in each of the plurality of anti-rotation plates can have twelve equally-spaced points to enable twelve orientations of the anti-rotation plate to fit over the proximal end of the intermediate nut.

The intermediate weight can also include intermediate recesses, where each of the intermediate recesses is sized and shaped to fit over one of the starter nuts. The outer weight can also include outer recesses, where each of the outer recesses is sized and shaped to fit over one of the intermediate nuts. The starter nuts and the intermediate nuts can be interchangeable. Each of the intermediate nuts can have a proximal end with a hexagonal shaped cross-section and a distal end with a circular shaped cross-section, and a threaded opening that extends from the proximal end to the distal end.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
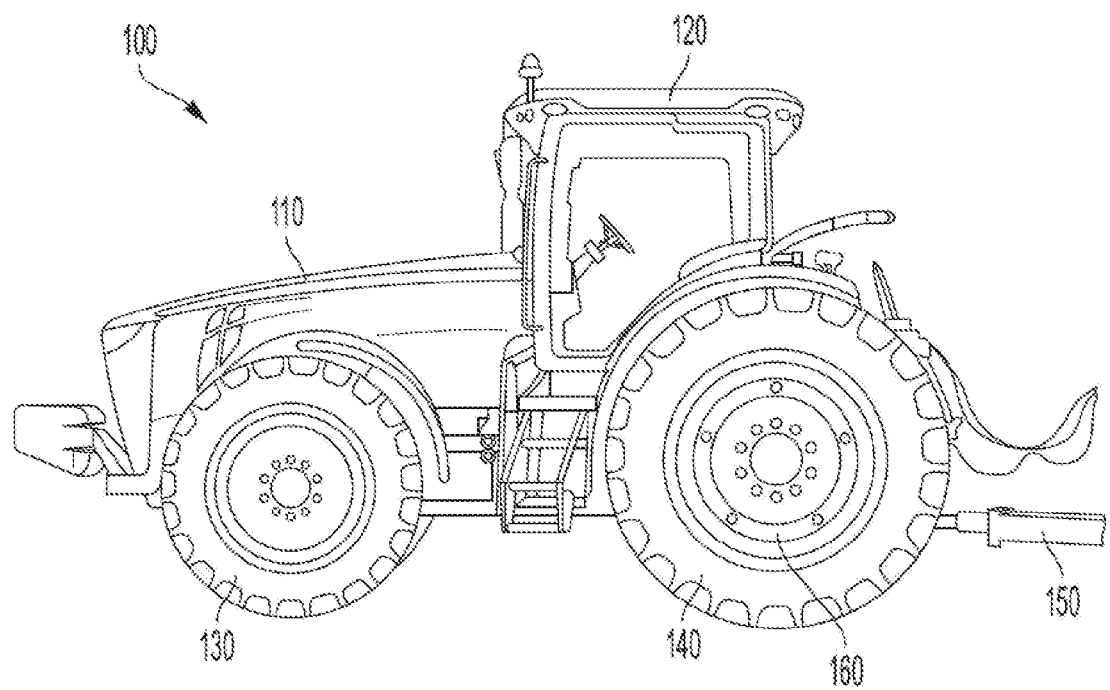
FIG. 1 illustrates an exemplary embodiment of a vehicle that includes a wheel weight assembly.

FIG. 1 illustrates an exemplary embodiment of a tractor 100 that includes an engine compartment 110 that holds an engine, an operator cab 120, front wheels 130, rear wheels 140 and an implement connector 150. The front and rear wheels 130, 140 support the engine compartment 110 and operator cab 120 above the ground. An implement can be coupled to the implement connector 150 to be pulled and/or controlled by the tractor 100. The operator cab 120 includes controls for an operator to control the tractor 100, including the engine, wheels 130, 140 and other components of the tractor and can include controls for the operator to control an implement coupled to the implement connector 150. The engine provides power to turn the wheels 130, 140 to propel the tractor 100. At least the front wheels 130 can be steerable to steer the tractor 100, and alternatively both the front and rear wheels 130, 140 can be steerable to steer the tractor 100. The operator cab 120 provides the operator with a clear view of the area being worked by the tractor 100.

FIG. 1 also illustrates a wheel weight assembly 160 coupled to the rear wheels 140 of the tractor 100. The wheel weight assembly 160 includes a system of fasteners and weights in which the fasteners can hold outer and/or inner rear wheel weights to the rear wheel, and in which the fasteners are able to be re-torqued from an outboard access.

Figure 2:
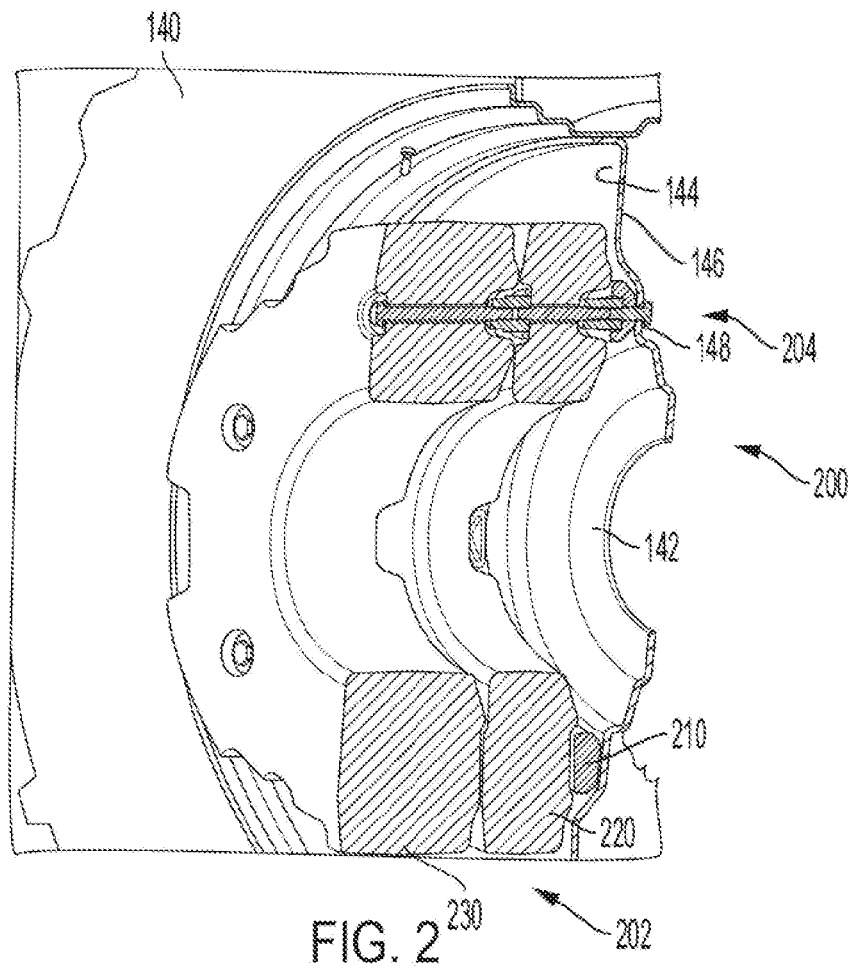
FIG. 2 illustrates a cross-section of an exemplary wheel weight assembly attached to a disk of a wheel.
Figure 3:
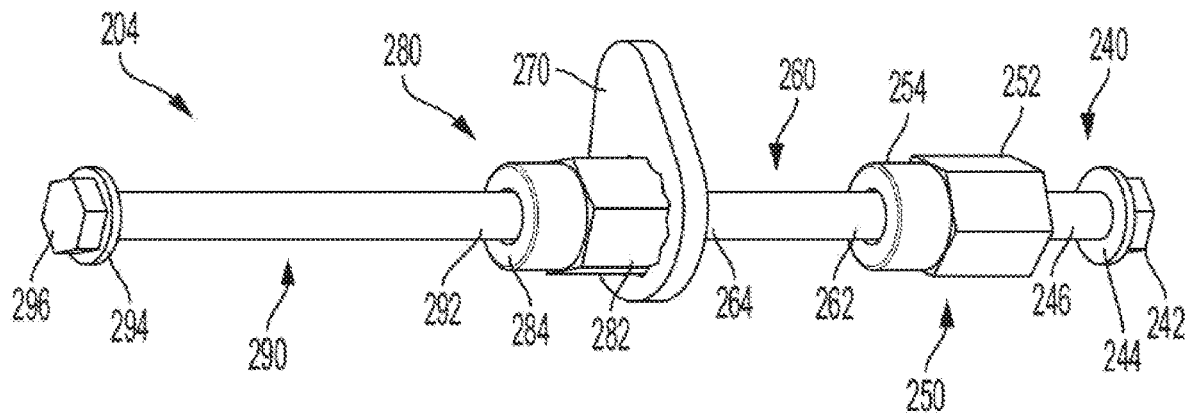
FIG. 3 illustrates an exemplary fastener assembly that includes an inner bolt, a starter nut, an intermediate stud, an anti-rotation plate, an intermediate nut and an outer bolt.

A cross-section of an exemplary wheel weight assembly 200 attached to a disk 142 of the rear wheel 140 is illustrated in FIG. 2. The disk 142 includes an outer face 144 and an inner face 146 and a plurality of through-holes 148 extending axially between the outer face 144 and the inner face 146. The wheel weight assembly 200 includes a plurality of weights 202 attached to one another and to the rear wheel 140 by a plurality of fastener assemblies 204. In this exemplary embodiment, the plurality of weights 202 includes a starter wheel weight 210, an intermediate wheel weight 220, and an outer wheel weight 230. In this exemplary embodiment, each of the plurality of fastener assemblies 204 (shown in FIG. 3 without weights or disk) includes an inner bolt 240, a starter nut 250, an intermediate stud 260, an anti-rotation plate 270, an intermediate nut 280 and an outer bolt 290.

The inner bolt 240 passes through the disk 142 and the starter weight 210. The starter nut 250 attaches to the inner bolt 240 to couple the starter weight 210 to the disk 142 of the rear wheel 140. The intermediate stud 260 threads into the starter nut 250 and passes through the intermediate wheel weight 220 and the anti-rotation plate 270. The intermediate nut 280 attaches to the intermediate stud 260 to couple the intermediate wheel weight 220. The outer bolt 290 passes through the outer wheel weight 230 and threads into the intermediate nut 280 to couple the outer wheel weight 230. These components and couplings will be described in more detail below with reference to the following figures.

Figure 4:
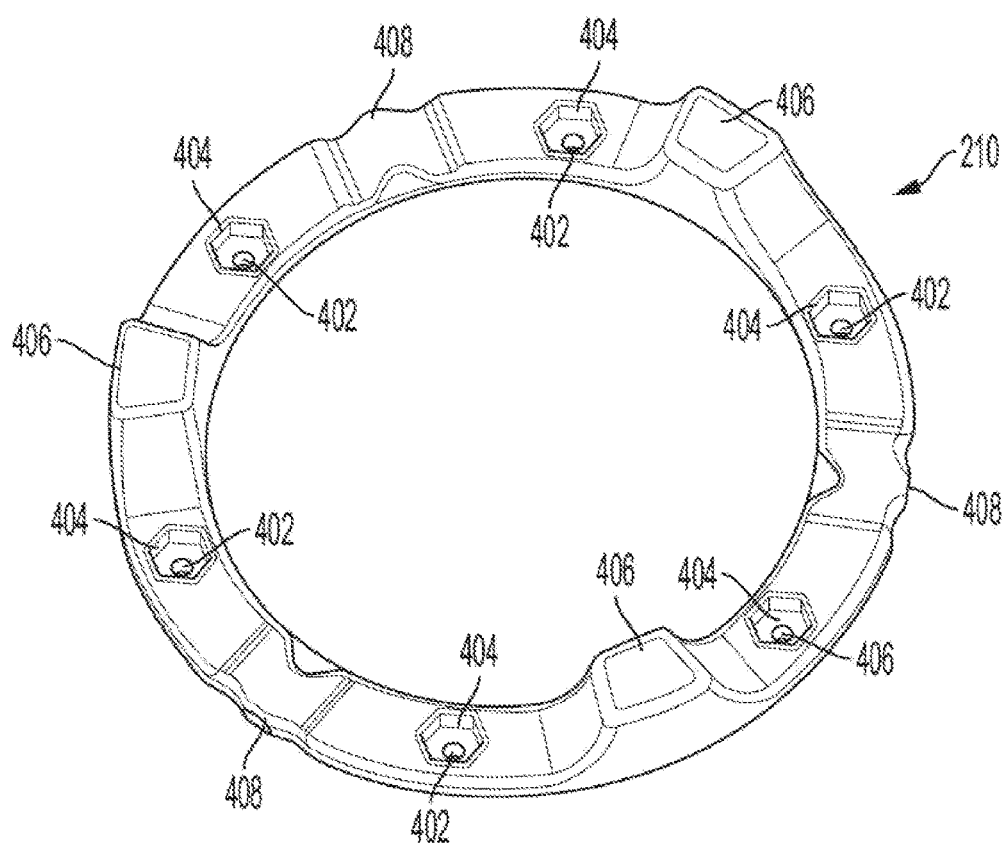
FIG. 4 illustrates an exemplary embodiment of a starter weight.

FIG. 4 illustrates an exemplary embodiment of the starter weight 210. The starter weight 210 is ring-shaped and has a plurality of mounting bores 402 located in cast insets 404, a plurality of centering tabs 406 and a plurality of bumps 408. Each of the mounting bores 402 extends axially through the starter weight 210, and is located to align with the through-holes 148 of the disk 142. Surrounding each mounting bore 402 is one of the insets 404, where each of the insets 404 is an axially outwardly extending opening. Each of the mounting bores 402 is machined through the center of the inset 404 associated therewith. Each of the insets 404 can have a polygonal-shape, for example hexagonal-shape, or other shape to prevent turning of the starter nut 250 located therein as described below. The plurality of centering tabs 406 are spaced apart around the starter weight 210, and each centering tab 406 projects axially outwardly from the starter weight 210. The plurality of bumps 408 are spaced apart around the starter weight 210, and each bump 408 projects radially outwardly from the starter weight 210. The plurality of centering tabs 406 and bumps 408 can be used to help mount and align the intermediate wheel weight 220 on the starter weight 210.

Figure 5:
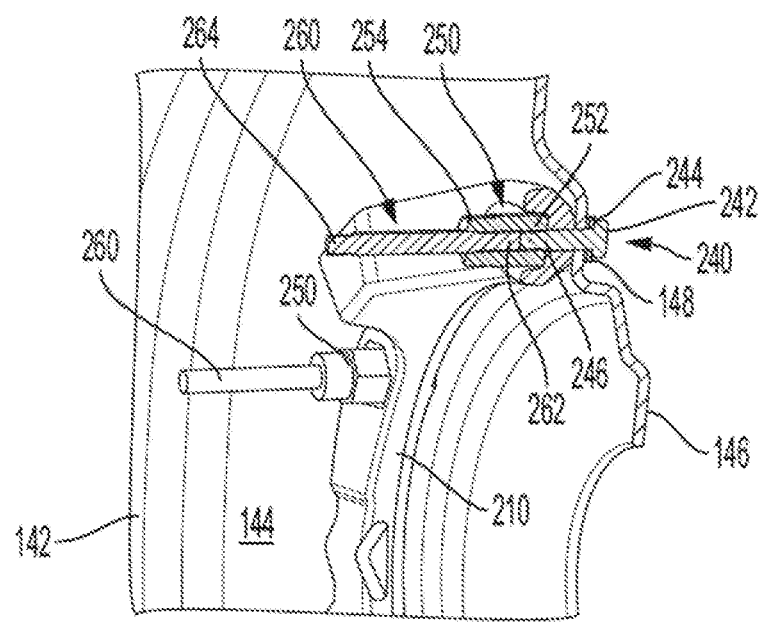
FIG. 5 illustrates the starter weight mounted to the disk of a wheel.
Figure 9:
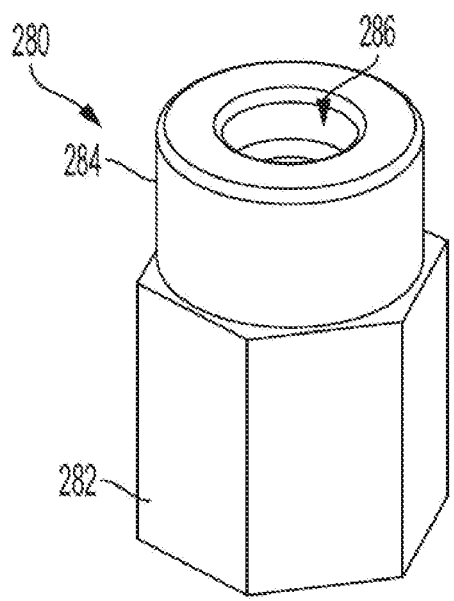
FIG. 9 illustrates an exemplary embodiment of an intermediate nut that has a proximal end with a generally hexagonal shaped cross-section and a distal end with a generally circular shaped cross-section, and an opening that extends through the length of the intermediate nut.

FIG. 5 illustrates the starter weight 210 mounted to the disk 142 of the rear wheel 140. A starter nut 250 is received by each of the insets 404 of the starter weight 210. Each of the starter nuts 250 has a proximal end 252 with an outer shape formed to match the shape of the insets 404 of the starter weight 210. The starter nuts 250 can be but do not have to be the same as or interchangeable with the intermediate nuts 280. An exemplary embodiment of an intermediate nut 280 that can be used as a starter nut 250 is shown in FIG. 9. The nut 280 has a proximal end 282 with a generally hexagonal shaped cross-section and a distal end 284 with a generally circular shaped cross-section, and an opening 286 that extends through the length of the nut 280 and is threaded internally. The starter weight 240 is mounted to the outer face 144 of the disk 142 by inner bolts 240. Each of the inner bolts 240 has a proximal bolt head 242 and a distal threaded end 246. The inner bolts 240 can also include a washer 244 that is part of the proximal bolt head 242 or a separate component.

The inner bolts 240 are placed through the through-holes 148 of the disk 142 with the proximal head 242 and washer 244 against the inner face 146 of the disk 142 and the distal threaded end 246 extending through the disk 142. The distal threaded ends 246 of the inner bolts 240 extend through the mounting bores 402 of the starter wheel weight 210 and are threadably received by the proximal end 252 of the starter nuts 250. The proximal head 242 of the inner bolts 240 can then be turned to tighten the starter weight 210 against the outer face 144 of the disk 142, and to tighten the proximal end 252 of the starter nuts 250 in the insets 404 of the starter weight 210. The shape of the insets 404 and the proximal end 252 of the starter nuts 250 helps prevent the starter nuts 250 from turning.

FIG. 5 also shows the intermediate studs 260 screwed into the distal ends 254 of the starter nuts 250. The intermediate studs 260 extend axially from a proximal end 262 to a distal end 264. The intermediate studs 260 can be threaded along their entire length or can be threaded only at the proximal and distal ends 262, 264 without threading therebetween. The proximal ends 262 of the intermediate studs 260 are screwed into the starter nuts 250. The opening in each of the starter nuts 250 can extend all the way from the proximal end 252 to the distal end 254 and be threaded along its entire length so that the proximal ends 262 of the intermediate studs 260 can contact the distal ends 246 of the inner bolts 240.

Figure 6:
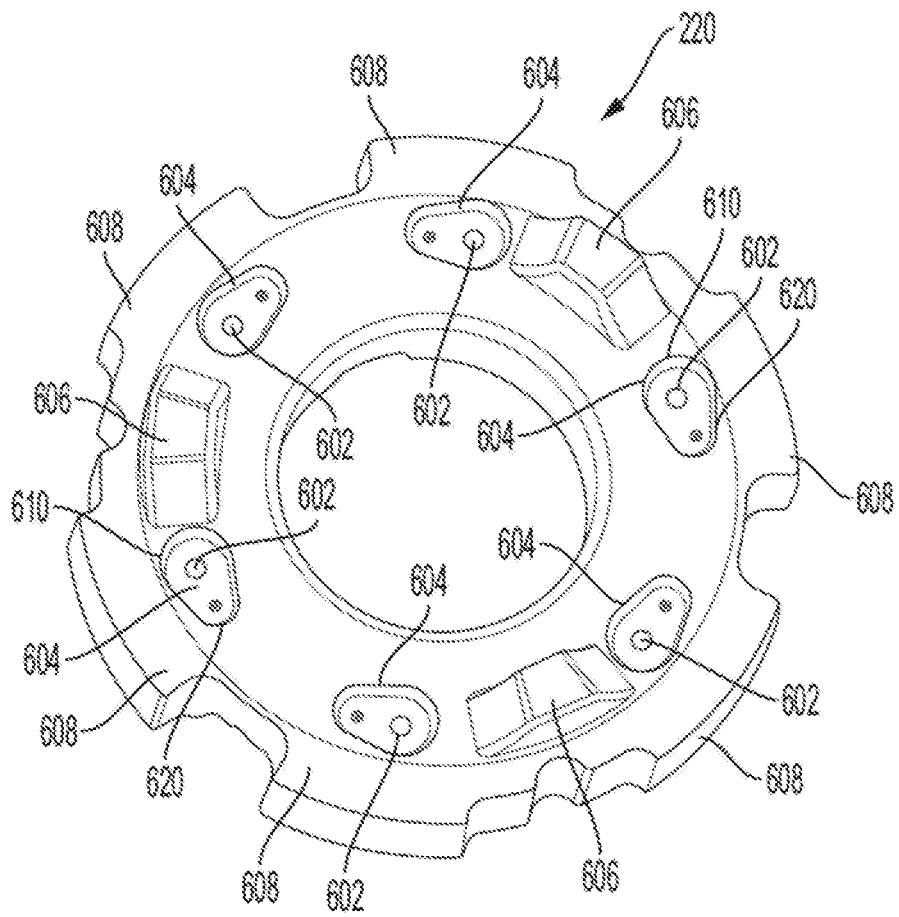
FIG. 6 illustrates an exemplary embodiment of an intermediate weight.

FIG. 6 illustrates an exemplary embodiment of the intermediate wheel weight 220. The intermediate wheel weight 220 is ring-shaped and has a plurality of mounting bores 602 located in cast recesses 604, a plurality of centering tabs 606 and a plurality of bumps 608. Each of the mounting bores 602 extends axially through the intermediate weight 220, and is located to align with the intermediate studs 260. Surrounding each mounting bore 602 is one of the recesses 604, where each of the recesses 604 is an axially outwardly extending cast opening. The plurality of centering tabs 606 are spaced apart around the intermediate weight 220, and each centering tab 606 projects axially outwardly from the intermediate weight 220. The plurality of bumps 608 are spaced apart around the intermediate weight 220, and each bump 608 projects radially outwardly from the intermediate weight 220. The plurality of centering tabs 606 and bumps 608 can be used to help mount and align the outer wheel weight 230 on the intermediate wheel weight 220. The intermediate weight 220 can also include a plurality of intermediate recesses 630 where each of the plurality of intermediate recesses 630 is sized and shaped to fit over one of the plurality of starter nuts 250. The intermediate weight 220 is preferably larger and heavier than the starter weight 210.

Figure 7:
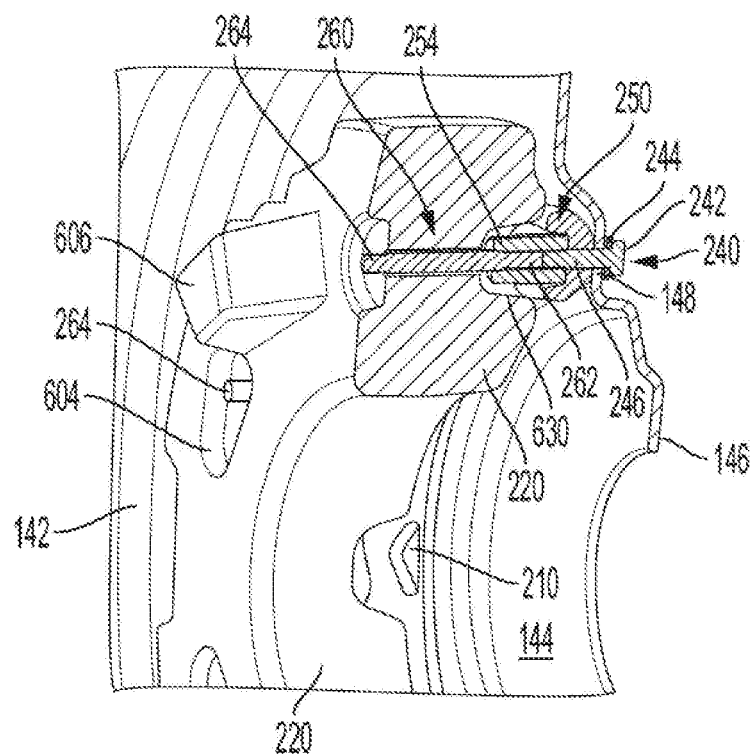
FIG. 7 illustrates the intermediate weight mounted on the starter weight.

FIG. 7 illustrates the intermediate weight 220 mounted on the starter weight 210. The mounting bores 602 of the intermediate weight 220 are aligned with the distal ends 264 of the intermediate studs 260 and the intermediate weight 220 is pushed back against the starter weight 210. The underside of the intermediate weight 220 can include intermediate recesses 630 under each of the mounting bores 602 such that each of the intermediate recesses 630 fits over one of the starter nuts 250 when the mounting bores 602 of the intermediate weight 220 are aligned with the intermediate studs 260 and the intermediate weight 220 is pushed back against the starter weight 210. The centering tabs 406 and bumps 408 of the starter weight 210, along with the intermediate recesses 630 of the intermediate weight 220, can help mount and position the intermediate wheel weight 220 on the starter weight 210. The distal ends 264 of the intermediate studs 260 extend through the mounting bores 602 and into the recesses 604 of the intermediate wheel weight 220.

Figure 8:
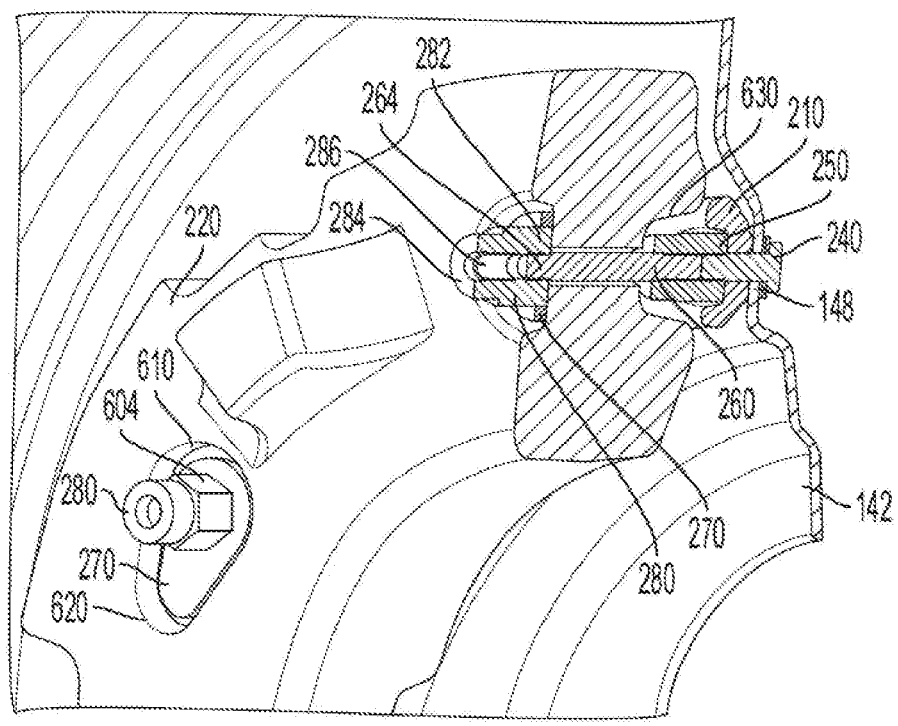
FIG. 8 illustrates intermediate nuts screwed on intermediate studs to secure the intermediate weight on the starter weight, and anti-rotation plates placed over the intermediate nuts and into the recesses of the intermediate weight.

FIG. 8 illustrates the intermediate nut 280 screwed on the distal end 264 of the intermediate stud 260 to secure the intermediate weight 220 on the starter weight 210 and then the anti-rotation plate 270 placed over the intermediate nut 280. Each of the mounting bores 602 is located in each of the recesses 604 and each of the recesses 604 is shaped such that one of the intermediate nuts 280 can be tightened on the distal end 264 of the intermediate stud 260 to securely mount the intermediate weight 220 on the starter weight 210, and the anti-rotation plate 270 can then be placed over the intermediate nut 280 and into the recess 604.

Figure 10:
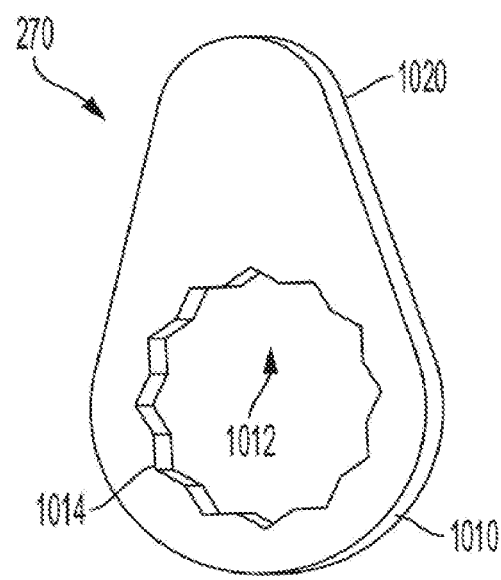
FIG. 10 illustrates an exemplary embodiment of an anti-rotation plate which is generally pear-shaped with a broader end and a narrower end, and a cutout in the broader end.

The intermediate nut 280, anti-rotation plate 270 and recess 604 are shaped such that once the intermediate nut 280 is tightened against the intermediate weight 220, and the anti-rotation plate 270 is placed over the intermediate nut 280 and in the recess 604; the anti-rotation plate 270 prevents further turning (tightening or untightening) of the intermediate nut 280 due to the anti-rotation plate 270 turning with the intermediate nut 280 and hitting against the sides of the recess 604. FIG. 9 illustrates an exemplary embodiment of an intermediate nut 280 that has a proximal end 282 with a generally hexagonal shaped cross-section and a distal end 284 with a generally circular shaped cross-section, and an opening 286 that extends through the length of the intermediate nut 280 and is threaded internally. FIG. 10 illustrates an exemplary embodiment of an anti-rotation plate 270 which is generally pear-shaped or teardrop-shaped with a broader end 1010 and a narrower end 1020, and a cutout 1012 in the broader end 1010. The edge shape of the recess 604 (see FIG. 6) is also generally pear-shaped with a broader end 610 and a narrower end 620 to fit the perimeter shape of the anti-rotation plate 270. The broader end 610 of the recess 604 is wide enough to allow rotation of the proximal end 282 of the intermediate nut 280. The cutout 1012 of the anti-rotation plate 270 is shaped to fit over the intermediate nut 280 and prevent rotation of the proximal end 282 of the intermediate nut 280 without rotation of the anti-rotation plate 270. In this exemplary embodiment, the proximal end 282 of the intermediate nut 280 has a hexagonal shaped cross-section with six equal length sides, so it has six equally-spaced vertices. The cutout 1012 of the anti-rotation plate 270 has twelve equally-spaced points 1014 to enable twelve orientations of the anti-rotation plate 270 to fit over the proximal end 282 of the intermediate nut 280 where only a few of those orientations are desired orientations that allow the anti-rotation plate 270 to fit in the recess 604 of the intermediate weight 220. When the intermediate nut 280 is tightened against the intermediate weight 220 on the distal end 264 of the intermediate stud 260, and the anti-rotation plate 270 is placed over the proximal end 282 of the intermediate nut 280 and into the recess 604; the anti-rotation plate 270 prevents further turning (tightening or untightening) of the intermediate nut 280 due to the anti-rotation plate 270 turning with the intermediate nut 280 and hitting against the sides of the recess 604. This prevents the entire fastener assembly 204 from turning (tightening or untightening).

Figure 11:
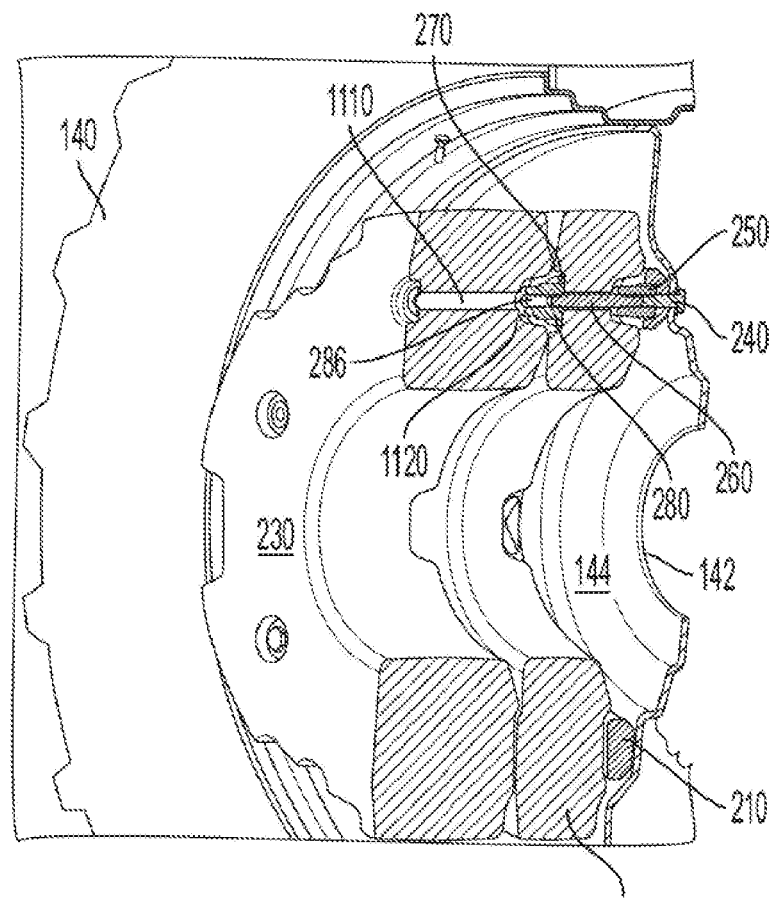
FIG. 11 illustrates an outer weight mounted on the intermediate weight.

FIG. 11 illustrates the outer weight 230 mounted on the intermediate weight 220. The outer wheel weight 230 is ring-shaped and has a plurality of mounting bores 1110 and a plurality of outer recesses 1120. Each of the mounting bores 1110 extends axially through the outer weight 230 and is aligned with one of the outer recesses 1120. The outer recesses 1120 of the outer weight 230 are sized and shaped to fit over the intermediate nuts 280 to align the mounting bores 1110 of the outer weight 230 with the opening 286 that extends through the length of the intermediate nut 280. The centering tabs 606 and bumps 608 of the intermediate weight 220, along with the outer recesses 1120 of the outer weight 230, can help mount and position the outer weight 230 on the intermediate weight 220. The outer weight 230 is preferably larger and heavier than the intermediate weight 220.

Figure 12:
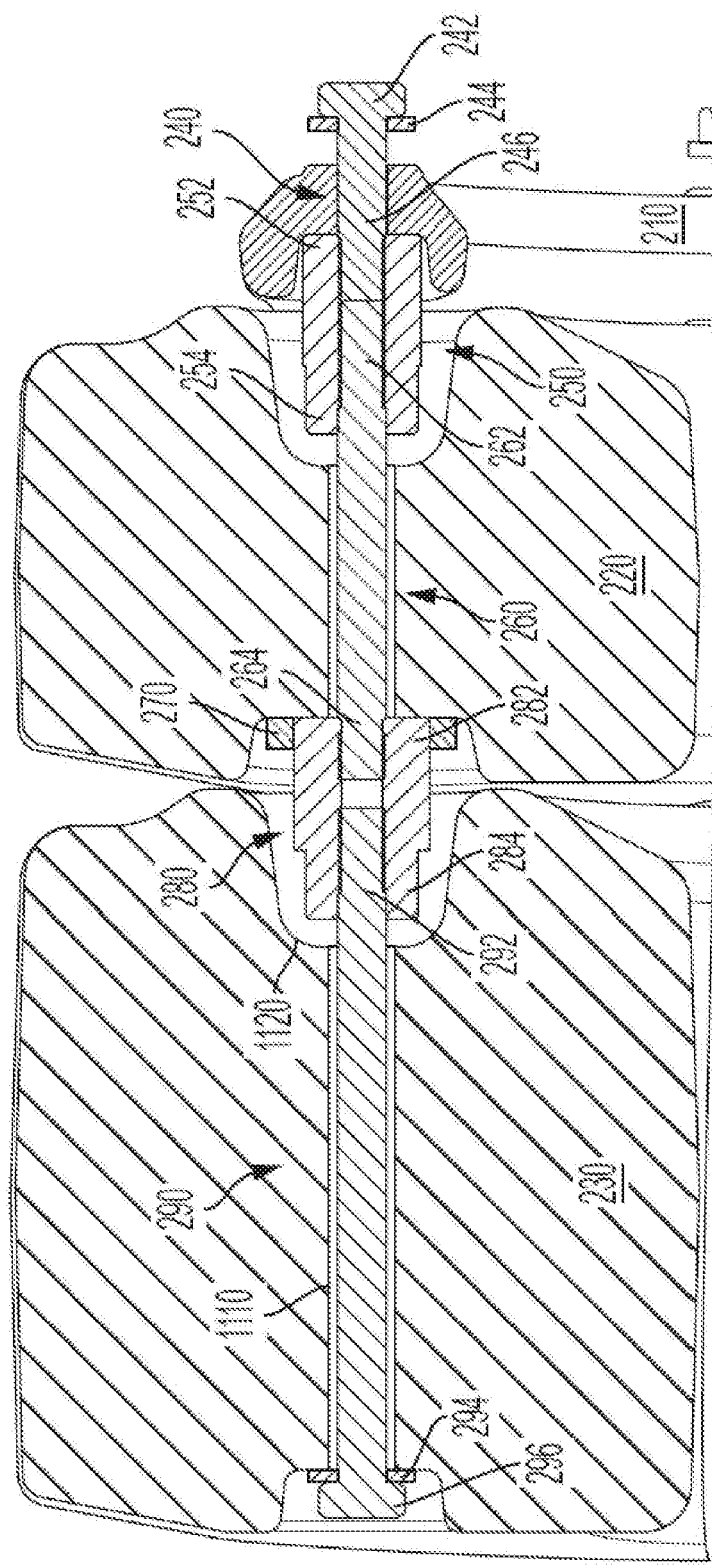
FIG. 12 illustrates a cross-section of an exemplary embodiment of the wheel weight assembly with the fastener assembly engaged, and leaving a space where the disk would go between the proximal head of the inner bolt and the starter weight.

FIG. 12 illustrates a cross-section of an exemplary embodiment of the wheel weight assembly 160 with the fastener assembly 204 engaged, and leaving a space where the disk 142 would go between the proximal head 242 of the inner bolt 240 and the starter weight 210. FIG. 12 illustrates an outer bolt 290 inserted through one of the mounting bores 1110 of the outer weight 230 and screwed into the one of the intermediate nuts 280. Each of the outer bolts 290 has a proximal threaded end 292 and a distal bolt head 296. The outer bolts 290 can also include a washer 294 that is part of the distal bolt head 296 or a separate component. When the mounting bores 1110 of the outer weight 230 are aligned with the openings 286 of the intermediate nuts 280, one of the outer bolts 290 is inserted through each of the mounting bores 1110 and the proximal threaded end 292 of the outer bolt 290 is screwed into the distal end 284 of the intermediate nut 280. The outer bolts 290 can be tightened to securely hold the outer weight 230 against the intermediate weight 220, because the anti-rotation plate 270 prevents the intermediate nut 280 from rotating as the outer bolt 290 is tightened against the outer weight 230.

The fastener assemblies 204 trap all three wheel weights 210, 220, 230 and the disk 142 between the proximal heads 242 of the inner bolts 240 and the distal bolt heads 296 of the outer bolts 290. When the distal bolt head 296 of an outer bolt 290 is torqued, this shortens the entire length of the fastener assembly 204 and provides clamp load to the entire weight stack 210, 220, 230 between the bolt heads 242, 296. This is possible because the intermediate nut 280 is prevented from rotating by the anti-rotation plate 270 and the cast recess 604 of the intermediate weight 220.

With this wheel weight assembly 160, it is possible to re-torque or re-tighten the fastener assembly 204 from either end and the central assembly remains tight. The outer bolt 290 can be re-torqued or re-tightened into the intermediate nut 280 which cannot rotate due to the anti-rotation plate 270 and the recess 604 of the intermediate weight 220. The inner bolt 240 can be re-torqued or re-tightened into the starter nut 250 which cannot rotate due to the cast insets 404 of the starter weight 210. The central assembly of the starter nut 250, the intermediate stud 260 and the intermediate nut 280 cannot rotate to loosen or tighten due to the starter nut 250 and intermediate nut 280 being prevented from rotating.

The larger outer weight 230 can be easily removed without removing the intermediate or starter weights 220, 210. The wheel weight assembly 160 maintains compatibility with current wheel configurations. The wheel 140 can be removed from the hub (not shown) without requiring removal of the starter weight 210.

The fastener assemblies 204 could be further extended to include additional wheel weights by repeating the combination of an intermediate stud 260, an intermediate nut 280 and an anti-rotation plate 270 that prevents the intermediate nut 280 from rotating. For example, a second intermediate stud could extend through the mounting bore 1110 of the current outer weight 230 and screwed into the current intermediate nut 280; a second intermediate nut could be screwed onto the second intermediate stud and tightened against the current outer weight 230; a second anti-rotation plate could be placed over the second intermediate stud and into a recess on the current outer weight 230, then a second outer weight could be mounted on the outside of the current outer weight 230 with the outer bolts 290 extending through mounting bores of the second outer weight and screwed into the second intermediate nuts.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A wheel weight assembly for mounting to a vehicle wheel that includes a disk, the wheel weight assembly comprising:
    an inner weight having a plurality of mounting bores that extend axially through the inner weight, and a plurality of recesses where each mounting bore is located in an associated recess;
    a plurality of inner fasteners, each inner fastener configured to extend through one of the plurality of mounting bores of the inner weight, each inner fastener having a proximal end configured to attach to the disk and a distal end configured to attach in the associated recess;
    a plurality of anti-rotation plates, each anti-rotation plate configured to cooperate with the distal end of one of the plurality of inner fasteners within the associated recess of the inner weight;
    an outer weight having a plurality of mounting bores that extend axially through the outer weight; and
    a plurality of outer fasteners, each outer fastener configured to extend through one of the mounting bores of the outer weight and attach to the distal end of one of the plurality of inner fasteners to hold the outer weight to the disk.

2. The wheel weight assembly of claim 1, wherein each inner fastener of the plurality of inner fasteners comprises:
    an inner nut;
    a stud configured to extend through one of the mounting bores of the inner weight, the stud having a proximal end and a distal end, and
    an outer nut configured to attach to one of the plurality of outer fasteners;
    wherein the inner nut is configured to attach to the proximal end of the stud; the distal end of the stud is configured to extend through the one of the plurality of mounting bores of the inner weight into the associated recess; and the outer nut is configured to attach to the distal end of the stud to hold the inner weight to the disk.

3. The wheel weight assembly of claim 2, wherein for each attachment between an outer nut of the plurality of outer nuts, an anti-rotation plate of the plurality of anti-rotation plates and a stud of the plurality of studs in a recess of the plurality of recesses of the inner weight, when the outer nut is attached to the distal end of the stud in the recess of the inner weight, and the anti-rotation plate is fit over the outer nut and into the recess of the inner weight then a nut shape of the outer nut, a plate shape of the anti-rotation plate and a recess shape of the recess prevent further rotation of the outer nut in the recess of the inner weight.

4. The wheel weight assembly of claim 3, wherein a proximal end of each of the plurality of outer nuts of the plurality of inner fasteners has a generally hexagonal shaped cross-section.

5. The wheel weight assembly of claim 3, wherein each of the plurality of anti-rotation plates has a generally pear-shape with a broader end and a narrower end, and a cutout in the broader end, the cutout shaped to fit over one of the plurality of outer nuts.

6. The wheel weight assembly of claim 5, wherein each of the plurality of recesses of the inner weight has a generally pear-shape with a broader end and a narrower end, the mounting bore associated with the recess being located closer to the broader end than the narrower end of the pear-shape, and the pear-shape of the recess shaped to fit the pear-shape of one of the plurality of anti-rotation plates.

7. The wheel weight assembly of claim 3, wherein a proximal end of each of the plurality of outer nuts has a polygonal shaped cross-section;
    each of the plurality of anti-rotation plates has a generally pear-shape with a broader end and a narrower end, and a cutout in the broader end, the cutout shaped to fit over one of the plurality of outer nuts; and
    each recess of the plurality of recesses of the inner weight has a generally pear-shape with a broader end and a narrower end, the mounting bore associated with the recess being located closer to the broader end than the narrower end of the pear-shape, and the pear-shape of the recess shaped to fit the pear-shape of one of the plurality of anti-rotation plates.

8. A wheel weight assembly for mounting to a vehicle wheel that includes a disk with an outer face and an inner face, the wheel weight assembly comprising:
    a starter weight having a plurality of mounting bores that extend axially through the starter weight;
    a plurality of inner fasteners, a portion of each inner fastener configured to extend through one of the plurality of mounting bores of the starter weight and the plurality of inner fasteners configured to attach the starter weight to the outer face of the disk;
    an intermediate weight having a plurality of mounting bores that extend axially through the intermediate weight, and a plurality of connection recesses where each mounting bore is located in an associated connection recess;
    a plurality of intermediate fasteners, a portion of each intermediate fastener configured to extend through one of the plurality of mounting bores of the intermediate weight and into the associated connection recess, each intermediate fastener having a proximal end and a distal end, the proximal end configured to attach to one of the plurality of inner fasteners and the distal end configured to extend into the associated connection recess of the intermediate weight to attach the intermediate weight to the starter weight;
    a plurality of anti-rotation plates, each anti-rotation plate configured to fit over one of the plurality of intermediate fasteners and fit within one of the plurality of connection recesses of the intermediate weight;
    an outer weight having a plurality of mounting bores that extend axially through the outer weight; and
    a plurality of outer fasteners, each outer fastener configured to extend through one of the plurality of mounting bores of the outer weight and attach to one of the plurality of intermediate fasteners to attach the outer weight to the intermediate weight.

9. The wheel weight assembly of claim 8,
wherein each inner fastener of the plurality of inner fasteners comprises an inner bolt and a starter nut, where each inner bolt has a distal end and is configured to extend through one of the plurality of mounting bores of the starter weight, and each starter nut is configured to attach to the distal end of the inner bolt to attach the starter weight to the outer face of the disk; and
wherein each intermediate fastener of the plurality of intermediate fasteners comprises an intermediate nut and an intermediate stud with a proximal end and a distal end, where each intermediate stud is configured to extend through one of the plurality of mounting bores of the intermediate weight and into the associated connection recess, the proximal end of the intermediate stud is configured to attach to one of the plurality of starter nuts of the plurality of inner fasteners and the distal end of the intermediate stud is configured to extend into the associated connection recess of the intermediate weight, each intermediate nut is configured to attach to the distal end of the intermediate stud to attach the intermediate weight to the starter weight; and
wherein each outer fastener of the plurality of outer fasteners is configured to attach to one of the plurality of intermediate nuts to attach the outer weight to the intermediate weight.

10. The wheel weight assembly of claim 9, wherein the starter weight includes a plurality of insets and each of the plurality of mounting bores of the starter weight is in one of the plurality of insets; and
wherein each starter nut of the plurality of starter nuts is configured to fit in a corresponding inset of the plurality of insets of the starter weight such that the corresponding inset prevents rotation of the starter nut.

11. The wheel weight assembly of claim 10, wherein each inner bolt of the plurality of inner bolts includes a proximal head, and each inner bolt is configured to extend through the disk and a corresponding mounting bore of the plurality of mounting bores of the starter weight such that the proximal head of the inner bolt contacts the inner face of the disk and the distal end of the inner bolt extends through the corresponding mounting bore.

12. The wheel weight assembly of claim 9, wherein for each attachment between an intermediate nut of the plurality of intermediate nuts, an anti-rotation plate of the plurality of anti-rotation plates and an intermediate stud of the plurality of intermediate studs in a connection recess of the plurality of connection recesses of the intermediate weight, when the intermediate nut is attached to the distal end of the intermediate stud in the connection recess of the intermediate weight, and the anti-rotation plate is fit over the intermediate nut and into the connection recess then a nut shape of the intermediate nut, a plate shape of the anti-rotation plate and a recess shape of the connection recess prevent further rotation of the intermediate nut in the connection recess of the intermediate weight.

13. The wheel weight assembly of claim 12, wherein a proximal end of each of the plurality of intermediate nuts has a generally hexagonal shaped cross-section.

14. The wheel weight assembly of claim 12, wherein each of the plurality of anti-rotation plates has a generally pear-shape with a broader end and a narrower end, and a cutout in the broader end, the cutout shaped to fit over one of the plurality of intermediate nuts.

15. The wheel weight assembly of claim 14, wherein each connection recess of the plurality of connection recesses of the intermediate weight has a generally pear-shape with a broader end and a narrower end, the mounting bore associated with the connection recess being located closer to the broader end than the narrower end of the pear-shape, and the pear-shape of the connection recess shaped to fit the pear-shape of one of the plurality of anti-rotation plates.

16. The wheel weight assembly of claim 12, wherein a proximal end of each of the plurality of intermediate nuts has a polygonal shaped cross-section;
each of the plurality of anti-rotation plates has a generally pear-shape with a broader end and a narrower end, and a cutout in the broader end, the cutout shaped to fit over one of the plurality of intermediate nuts; and
each connection recess of the plurality of connection recesses of the intermediate weight has a generally pear-shape with a broader end and a narrower end, the mounting bore associated with the connection recess being located closer to the broader end than the narrower end of the pear-shape, and the pear-shape of the connection recess shaped to fit the pear-shape of one of the plurality of anti-rotation plates.

17. The wheel weight assembly of claim 16, wherein the proximal end of each of the plurality of intermediate nuts has a hexagonal shaped cross-section, and the cutout in each of the plurality of anti-rotation plates has twelve equally-spaced points to enable twelve orientations of the anti-rotation plate to fit over the proximal end of the intermediate nut.

18. The wheel weight assembly of claim 9, wherein the intermediate weight further includes a plurality of intermediate recesses, each of the plurality of intermediate recesses sized and shaped to fit over one of the plurality of starter nuts; and
wherein the outer weight further includes a plurality of outer recesses, each of the plurality of outer recesses sized and shaped to fit over one of the plurality of intermediate nuts.

19. The wheel weight assembly of claim 9, wherein the plurality of starter nuts and the plurality of intermediate nuts are interchangeable.

20. The wheel weight assembly of claim 9, wherein each of the plurality of intermediate nuts has a proximal end with a hexagonal shaped cross-section and a distal end with a circular shaped cross-section, and a threaded opening that extends from the proximal end to the distal end.

* * * * *